United States Patent [19]
Kim et al.

[11] Patent Number: 5,833,321
[45] Date of Patent: Nov. 10, 1998

[54] VEHICLE SEAT HAVING HIGH AIR CIRCULATION AND MATERIALS USED THEREIN

[75] Inventors: Dai W. Kim, Chatham, N.J.; Gregory M. Clark, Weston, Conn.

[73] Assignee: Hoechst Celanese Corp, Somerville, N.J.

[21] Appl. No.: 767,506

[22] Filed: Dec. 16, 1996

Related U.S. Application Data

[60] Provisional application No. 60/009,143 Dec. 22, 1995.

[51] Int. Cl.⁶ ........................................... A47C 7/02
[52] U.S. Cl. ................. 297/452.42; 297/452.45
[58] Field of Search ............ 297/452.42, 452.43, 297/452.44, 452.45, 452.46, 452.47

[56] References Cited

U.S. PATENT DOCUMENTS

| | | |
|---|---|---|
| Re. 31,345 | 8/1983 | Swartzkopff et al. . |
| 2,029,370 | 2/1936 | Heldenbrand . |
| 3,137,523 | 6/1964 | Karner ........................... 297/452.47 X |
| 3,219,514 | 11/1965 | De Roysancour . |
| 3,391,413 | 7/1968 | Crane et al. ....................... 297/452.45 |
| 3,691,004 | 9/1972 | Werner et al. . |
| 3,722,955 | 3/1973 | Trotman ............................ 297/452.45 |
| 4,128,684 | 12/1978 | Bomio et al. . |
| 4,143,916 | 3/1979 | Trotman et al. ................... 297/452.45 |
| 4,212,692 | 7/1980 | Rasen et al. . |
| 4,252,590 | 2/1981 | Rasen et al. . |
| 4,313,640 | 2/1982 | Trotman et al. . |
| 4,405,749 | 9/1983 | Nelsen . |
| 4,486,493 | 12/1984 | Burmester et al. . |
| 4,520,150 | 5/1985 | Golder . |
| 4,584,228 | 4/1986 | Droste . |
| 4,631,221 | 12/1986 | Disselbeck et al. . |
| 4,673,616 | 6/1987 | Goodwin . |
| 4,890,877 | 1/1990 | Ashtiani-Zarandi et al. . |
| 5,106,161 | 4/1992 | Meiller ........................... 297/452.47 X |
| 5,158,821 | 10/1992 | Gebauer et al. . |
| 5,364,686 | 11/1994 | Disselbeck et al. . |
| 5,447,776 | 9/1995 | Desselbeck . |
| 5,645,314 | 7/1997 | Liou ............................... 297/452.45 X |

FOREIGN PATENT DOCUMENTS

| | | |
|---|---|---|
| 324714 B1 | 7/1989 | European Pat. Off. . |
| 386864 B1 | 9/1990 | European Pat. Off. . |
| 386387 B1 | 5/1992 | European Pat. Off. . |
| 41 35 364 A1 | 4/1993 | Germany . |
| 295 05 981 U | 4/1995 | Germany . |

OTHER PUBLICATIONS

Patent Abstracts of Japan, vol. 018, No. 168 (M–1580), 22 Mar. 1994 & JP 05 337258 A (Toyobo Co Ltd), 21 Dec. 1993.

Patent Abstracts of Japan, vol. 018, No. 012 (C–1150), 11 Jan. 1994 & JP 05 247819 A (Toyobo Co Ltd.), 24 Sep. 1993.

*Primary Examiner*—Laurie K. Cranmer
*Attorney, Agent, or Firm*—James L. McGinnis

[57] ABSTRACT

Automobile seats having improved comfort have a spacer layer included within the layers of cushioning materials. The spacer layer has a large void volume and nearly unrestricted flow of air. Heated, cooled or ambient air can be forced into the spacer layer of the seat, making the seat more comfortable with respect to temperature and removal of perspiration.

23 Claims, 3 Drawing Sheets

VEHICLE SEAT HAVING HIGH AIR CIRCULATION AND MATERIALS USED THEREIN

RELATED APPLICATIONS

Commonly assigned U.S. Pat. No. 5,731,062, filed Dec. 22, 1995; commonly assigned U.S. application Ser. No., Attorney Docket No. 1541Z, filed Mar. 23, 1998, which is a divisional of U.S. Pat. No. 5,731,062; commonly assigned U.S. application Ser. No. 08/754,953, filed Nov. 21, 1996, which claims the benefit of U.S. Provisional application Ser. No. 60/009,057, filed Dec. 22, 1995; and commonly assigned U.S. application Ser. No. 08/770,026, filed Dec. 19, 1996, which claims the benefit of U.S. Provisional application Ser. No. 60/009,061, filed Dec. 22, 1995, all contain related subject matter.

FIELD OF THE INVENTION

This invention relates to seats having improved comfort for use in automobiles and other vehicles. More specifically, the invention relates to seats that can be used in automobiles and other vehicles and that can readily be heated or cooled by the circulation of hot or cold air.

BACKGROUND OF THE INVENTION

Automobile and other vehicle seats typically use polyurethane and other foamed materials as cushioning materials. These have excellent cushioning properties. Other materials, such as felts and fibers, can also be used alone or in combination with foams in vehicle seats. Flexible foams that are used are open-cell foams, permitting movement of air into and out of the foam under compression and decompression. However, these foams and the various other fillers that are used to provide cushioning impede air flow through the seats, limiting ventilation within the seat. Innersprings may also be used in automotive seats. These allow free circulation of air, but they must be covered with a thick layer of foam or other soft material in order to provide comfort, again resulting in poor air circulation to the surface of the seat.

Typical cushioning materials also act as thermal insulators, causing heat to be retained if the seat is occupied. Thus, on a hot day, the seat feels warm for an extended period of time, even with air conditioning. Likewise, in cold weather, the seat initially feels cold and stays cold until it has been occupied for a time, unless the vehicle heating system has been in operation for a few minutes or unless the seat is heated electrically.

Automobile and other vehicle seats would be more comfortable if air could be rapidly circulated through the seat in close proximity to the body of the occupant. Circulation of heated or cooled air would make the temperature of the seat comfortable more quickly and would also eliminate accumulation of moisture due to perspiration.

SUMMARY OF THE INVENTION

Automobile seats having improved comfort have a spacer layer included within the layers of cushioning materials. The spacer layer is designed so that it has a large void volume, low density, and nearly unrestricted flow of air. Large void volume means that there is a large amount of open air space in the spacer layer. Furthermore, the air space is continuous throughout the layer, so that the air is not contained in isolated pockets as would be the case in closed-cell foams. Because the flow of air must be essentially unrestricted, open-cell foams also are not suitable as a spacer layer. Because of the large void volume, the spacer layer has a low apparent density (less than about 10% of the density of the materials used to make the spacer layer). The spacer layer generally will be close to the outer surface of the seat. The spacer layer must not detract from the cushioning properties of the seat, and preferably will enhance the cushioning properties. Innersprings are not suitable as they would have to be too close to the surface of the seat to be comfortable in this application. The spacer layer generally will comprise some kind of material that is loosely packed but has sufficient rigidity to maintain the openness of the spacer layer.

The spacer layer also may be connected with the ventilation system of the car, which provides a means for delivering ambient air, heated air, and/or air conditioning, to provide for heated or cooled seats. The air-heated seats should be more comfortable than electrically heated seats, which may have uneven heating. The connection of the seats to the air conditioning system makes it possible to cool the seats; cooling is not otherwise readily available.

A material that is ideally suited for use as a spacer layer is the three dimensional formed fiber network that is described in detail hereafter.

DETAILED DESCRIPTION OF THE INVENTION

Figure 1:
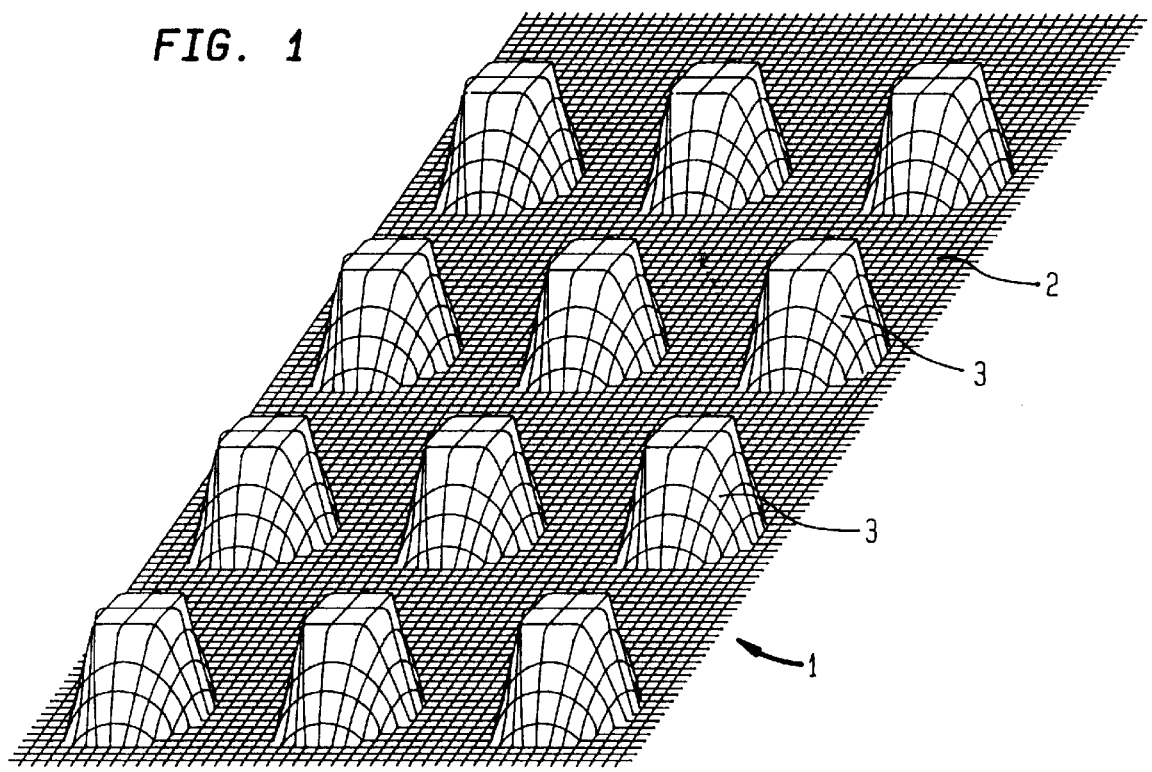
FIG. 1 shows schematically a section of a three-dimensional fiber network structure 1 having a multiplicity of "hat-shaped" projections 3 on base area 2. The open mesh structure of the fiber network is illustrated. These illustrative hat-shaped projections have a square base and square top, with the top having smaller dimensions than the base.

Vehicle seats generally contain two or more layers of cushioning materials and fabrics. The spacer layer is included as an additional layer in the seat. The spacer layer must be close to the outer surface of the seat (generally within about one inch) so that the air contained in the spacer layer can effectively act as a source of heat, air conditioning, or ventilation.

Preferably the air in the spacer layer will be in communication with the air above the seat, so that the spacer layer can help carry away perspiration; also, if heated or cooled air is forced into the spacer layer, the air can pass directly to the surface of the seat, resulting in rapid heating or cooling of the part of the seat that is in direct contact with the body, rather than indirect heating or cooling of the surface of the seat. Therefore, the spacer layer is preferably covered by one or more thin layers of porous material, such as cloth. One or more layers of less porous materials may also be used, such as polyurethane foam or leather, but these should include air channels between the spacer layer and the surface to enable the flow of air. The less porous materials without air channels may also be used as a covering above the spacer layer, but these are less preferred.

The air from the heating and cooling systems can be fed into one or a few openings in the spacer layer, with the air dispersing through the void volume of the spacer layer. Alternatively, there may be a framework within or under the spacer layer that feeds air from the heating and air conditioning system into the spacer layer at one or more points. The air would normally reach the seats through hoses or other duct work from the engine compartment.

The three dimensional fiber network that is described in detail below is an ideal material for use as the spacer layer. The fiber network, and thus the spacer layer, can be made in varying thicknesses. The comfort of the seat and its cushioning and ventilating properties can be controlled by setting the sizes, height, shapes and spacings of the projections of the formed fiber network. A single layer is generally used, but more than one layer of fiber network may be used in the spacer to thicken the spacer and to further modify the cushioning properties. The seat can also be ergonomically contoured by varying the dimensions of the projections to conform with the proportions and weight distribution of the seat occupant. The fiber network is also suitable for recycling if it is made entirely of a polymer that is readily recycled, such as PET.

The three dimensional fiber network structures that are useful as spacer layers are semi-rigid and dimensionally stable, but still have sufficient flexibility to be useful as cushioning materials as well as spacers. These fiber network structures are compressible, and when the compressive force is removed, the materials return to their original shape (i.e. they are resilient). These fiber network structures comprise filaments that are generally made of a single thermoplastic polymer or copolymer and do not include a thermoset polymer. The networks are made up of a multiplicity of projections rising from the plane of the textile fabric from which the fiber network is made. Projections are portions of the textile fabric that rise above the base plane, generally in an abrupt way. Depressions, which are projections on the opposite side and in the opposite direction from the base plane, may optionally also be present. The projections and optional depressions have retained an open fabric-like appearance, consisting of discrete filaments which are generally not bonded at the intersections where the individual filaments cross over one another. There may be bonds at the intersections if the attachments are easily broken (i.e. they are not "tightly bonded") when the network is initially compressed, after which the network becomes resilient. The network is "resilient" if the projections and optional depressions, substantially recover their shape after being compressed to 50% of their height. However, there may be minor changes in the shapes of the projections and optional depressions after they are compressed, as for example a change in the curvature of the edges at the top of the projection. As the density of tight bonds at the points at which the fibers cross over one another increases, the fiber network structure and the projections become more rigid, and the projections lose their resilience.

Because of the open structure of the textile fabric and the large void volume within the projections and/or depressions, the network has a low density compared with the polymer (generally less than about 10%, preferably less than about 5%) based on the amount of space occupied by the network. Air and other fluids can flow through the fiber network structure with little resistance. The filaments can be in the form of a monofilament having a diameter of at least about 0.1 mm, corresponding to about 100 dpf in the case of poly(ethylene terephthalate). The filaments used in the fiber networks can also be derived from multifilament yarns having approximately the same total diameter, provided that the individual filaments of the yarns have coalesced to larger filaments under heat and pressure during the shaping process, and further provided that the multifilament yarns have not become so firmly bonded at the points where they cross over one another that these bonds can't be broken when the fiber networks are compressed. The multifilament yarns that are coalesced into larger filaments may be hybrid yarns or contain bicomponent fibers. Preferably the multifilament yarns are made from a single polymer or copolymer.

The filaments are generally made of a single thermoplastic polymer or copolymer (or optionally a blend or polymer alloy) that melts at a temperature in the range of about 80° C. to about 375° C. As stated above, the filament may also be derived from hybrid yarn or bicomponent fiber, but this is less preferred. The polymer is preferably made into fiber by a melt spinning process. Classes of polymers that can be used to make three-dimensional fiber networks include polyesters, polyamides, thermoplastic copolyetherester elastomers, poly(arylene sulfides), polyolefins, aliphatic-aromatic polyamides, polyacrylates, and thermotropic liquid crystalline polymers.

The three-dimensional fiber network structure is generally made by deforming a textile fabric into the desired shape at a temperature high enough that the fibers can be permanently deformed, as would occur, for example, in a fiber drawing process. The temperature will generally be above the glass transition temperature (Tg), and, preferably will also remain below the melting temperature. The deformation is brought about using a thermomechanical process, which means the application of a mechanical force at an elevated temperature. The mechanical force can be applied using numerous methods, such as solid phase pressure forming, vacuum bladder match plate molding, interdigitation, deep drawing, use of a heated mold, and the like. Heat and pressure are applied for a sufficient time that the textile fabric is permanently deformed, but not for such a long time or at such a high temperature (e.g. well above the melting temperature) that the filaments coalesce, causing the shaped fiber network to lose its open net-like structure and resilience. The individual filaments in the three-dimensional fiber network structure still have retained much of their individual fiber-like appearance and properties.

The starting two-dimensional textile fabric that is utilized in making the three-dimensional fiber network structure is selected from any of the standard classes of fabrics, such as knit, woven, or non-woven textile fabrics. The type of fabric depends on the kind of resulting network structure that is desired. Knit fabrics have the advantage that their structure is readily deformed without excessive elongation of individual fibers, which leads to breakage of the fibers. They are also drapable. Woven fabrics have the advantage that they are more readily produced from larger diameter fibers, such as monofils. Non-woven fabrics are generally less preferred than woven and knit fabrics.

The three-dimensional fiber networks that have particular utility in vehicle seats have a multiplicity of projections on the plane of the textile fabric from which the network is made. Depressions may optionally also be present on the opposite side of the fabric from the projections. Examples of three-dimensional fiber networks and methods of making them are summarized in U.S. Pat. Nos. 5,364,686 and 4,631,221, herein incorporated by reference. The projections and optional depressions can be in the shape of cones or truncated cones, pyramids or truncated pyramids having polygonal bases, cylinders, prisms, spherical elements, and the like. Generally, the apex points or surfaces of the projections define a plane parallel to the base plane. Similarly if there are also depressions, their apex points or surfaces define a second surface, such as a plane parallel to the base plane. As a result, the preferred three-dimensional networks define two surfaces or planes, one being defined by the tops of the projections and the other being defined by either the base plane or the plane or surface defined by the depressions. Furthermore, the projections and optional depressions are generally arranged in a uniform or repetitive pattern with a uniform spacing. However, the shapes, heights, sizes and spacings of the projections and optional depressions can be modified to suit a specific application. For example, they may vary to conform to a specific shape, such as the shape of the human foot for use in shoes, and they may vary in rigidity to increase or decrease their weight-bearing capacity. The projections and/or depressions can also be elongated along one direction of the plane, and in the extreme case, can run the entire length or width of the textile, in which case the projections are really corrugations, like those typically seen in cardboard. Non-corrugated structures are preferred for most applications.

Figure 2:
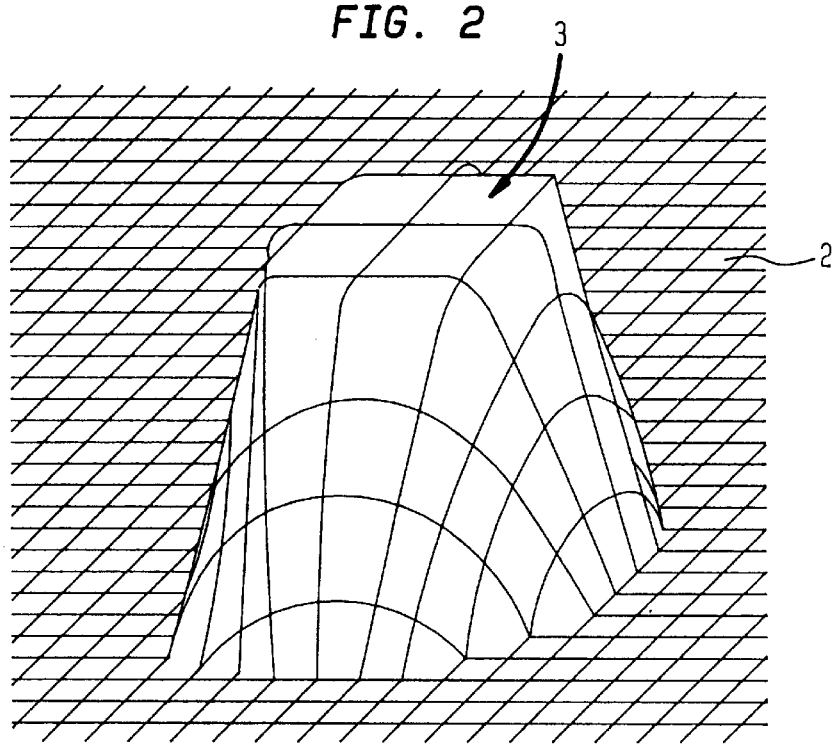
FIG. 2 schematically depicts an enlargement of one of the hat shaped projections 3 of FIG. 1, showing the widening of the mesh structure of the textile material which occurs in the area that is deformed.
Figure 3:
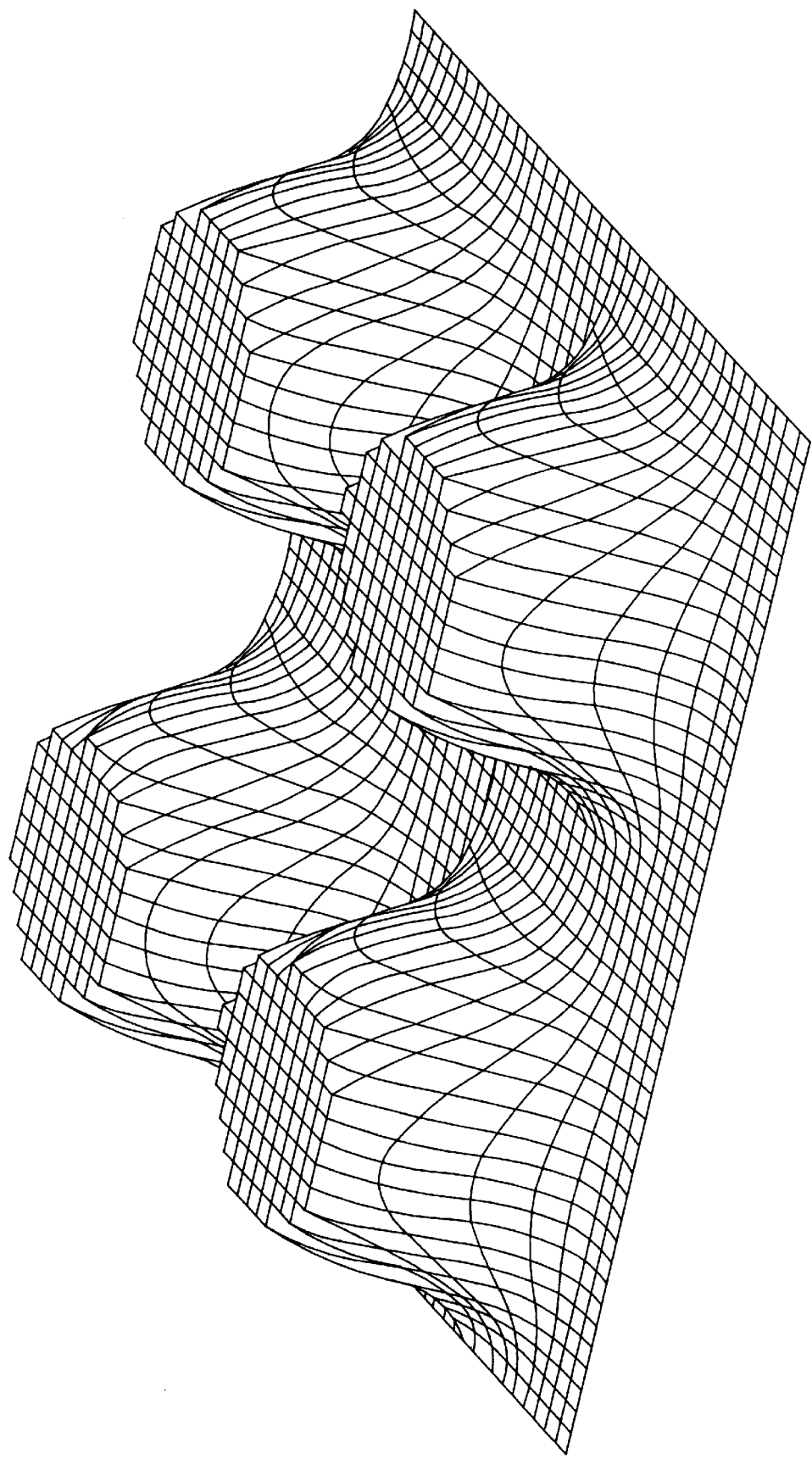
FIG. 3 schematically depicts an enlargement of four projections that are in the shape of truncated cones.

The sizes, heights, shapes and spacings of the pattern of projections and depressions affect the cushioning properties and "feel" of the three-dimensional networks. The rigidity of the individual fibers in the network structure also is a major factor in determining the cushioning properties of the three-dimensional networks, and the rigidity of the fibers in turn depends on the diameter of the filaments and the kind of materials (e.g. polymers) from which the filaments are made. For most applications, filament diameters are in the range of about 0.15 mm to about 0.7 mm. An example of a preferred structure of regularly spaced projections having a square base and a square top that has shorter sides than the base is shown in FIGS. 1 and 2. Another preferred structure consists of a regular array of projections which are truncated cones of similar size and shape, as shown in FIG. 3, for example.

The polymers used as filaments in the three-dimensional fiber networks preferably consist essentially of a single thermoplastic polymer or copolymer rather than composites of a reinforcing fiber and a matrix polymer, such as a thermoset, which have been utilized previously for making rigid networks. A polymer blend or alloy may also be used, although this is less preferred. The polymers may include minor amounts of additives, such as flame retardants, spinning lubricants, and the like. The thermoplastic polymers generally have a melting temperature in the range of about 80° C. to about 375° C., preferably about 140° C. to about 350° C. Thermoplastic polymers that are preferred for making three dimensional fiber networks in general include: (1) polyesters of alkylene glycols having 2–10 carbon atoms and aromatic diacids. Poly(alkylene terephthalates), especially poly(ethylene terephthalate) and poly(butylene terephthalate), are particularly preferred. Also preferred are poly(alkylene naphthalates), which are polyesters of 2,6-naphthalenedicarboxylic acid and alkylene glycols, as for example poly(ethylene naphthalate); (2) thermoplastic copolyetherester elastomers, described in more detail below; (3) polyamides, especially nylon 6 and nylon 66, which are commonly used in making fibers; (4) poly(arylene sulfides), especially poly(phenylene sulfide); (5) polyolefins, particularly polyethylene and polypropylene; (6) aliphatic aromatic polyamides, such as polyamides derived from terephthalic acid and 2-methyl-1,5-pentanediamine; (7) polyesters derived from 1,4-cyclohexanedimethanol and terephthalic acid; and (8) thermotropic liquid crystalline polymers, such as for example polyesters derived from 6-hydroxy-2-naphthoic acid and 4-hydroxybenzoic acid.

Specific preferred polymers for use as the spacer layer in vehicle seating include poly(ethylene terephthalate) (PET), thermoplastic copolyetherester elastomers, nylon 6 and 66, and polypropylene. PET is widely available from many manufacturers, including Hoechst Celanese Corporation, Somerville, N.J. The PET should be of high enough molecular weight to be suitable for spinning into fibers; generally a molecular weight corresponding to an intrinsic viscosity (I.V.) of at least about 0.6 dl/gm is suitable, where the I.V. is determined by measuring the relative viscosity of a 4% solution (weight/volume) in o-chlorophenol at 25° C. The relative viscosity is then converted to intrinsic viscosity. Polypropylene and nylons are also widely available from many manufacturers.

Thermoplastic copolyetherester elastomers, also referred to as thermoplastic elastomers, consist essentially of a multiplicity of recurring long chain ether ester units and short chain ester units joined head-to-tail through ester linkages. The long chain ether ester units are made up of poly(alkylene oxide) glycol units attached by way of ester linkages to terephthalic and/or isophthalic acid. The short chain ester units are the product of the reaction of a short chain glycol with isophthalic and/or terephthalic acid. The short chain ester units make up about 15% to about 95% by weight of the thermoplastic elastomer. Thermoplastic elastomers used in making the three-dimensional fiber networks are well known and are described in numerous references, including U.S. Pat. No. 3,023,192, 3,651,014, 3,763,109, 3,766,146, 3,784,520, 4,355,155, 4,405,749 and 4,520,150. Poly(tetramethylene oxide) glycol, also known as poly-THF, is the preferred poly(alkylene oxide) glycol for the long chain ether ester units. The preferred glycol in the short chain ester units is a mixture of 1,4-butanediol with up to about 40% by weight of 1,4-butenediol. Most preferably, the short chain glycol is only 1,4-butanediol. The preferred aromatic diacid used in making the short and long chain ester units is terephthalic acid containing up to about 20% isophthalic acid. Most preferably, terephthalic acid is the only diacid that is present. Thermoplastic copolyetherester elastomers that are composed of long chain ether ester units of poly-THF and terephthalic acid and short chain ester units of 1,4-butanediol and terephthalic acid are commercially available from Hoechst Celanese Corporation under the RITEFLEX® trademark.

Many of the polymers listed above, such as PET and nylon are flammable. Since the polymers are to be used in vehicles, the polymers will generally need to have a flame retardant additive included. Most flame retardants come from one of six chemical classes: aluminum trihydrate; organochlorine compounds; organobromine compounds; organophosphorous (including halogenated phosphorus) compounds; antimony oxides; and boron compounds. Flame retardants can also be divided into additives, which are blended with the substrate, and reactives, which are chemically bound to the substrate during polymerization in a separate step. Polymers that contain reactives as comonomers may contain up to about 10 mole % of the flame retardant monomers in the polymer composition. Other kinds of flame retardants that are sometimes used include intumescent coatings, sulfur or sulfur compounds (e.g. ammonium sulfamate and thiourea compounds) and oxides and carbonates of bismuth, tin, iron, and molybdenum. All of the above classes and kinds of flame retardants are reviewed in an article entitled "Flammability," by R. G. Gann, et al., in *Encyclopedia of Polymer Science and Engineering,* Second Edition, Volume 7, John Wiley and Sons, New York, 1987, pages 184–195. For PET, the preferred flame retardant is a reactive phosphorous compound that is incorporated into the polymer structure during polymerization and is available from Hoechst AG under the name Oxa-phospholane (a solid) or Oxa-phospholane Glycol Ester (a solution). The Oxa-phospholane products contain 2-carboxyethylmethylphosphinic acid as the free acid or as one or more ethylene glycol esters and diesters of the phosphinic acid. The 2-carboxyethylmethylphosphinic acid is incorporated into the polyester backbone at a level of up to about 5% of the polyester monomer units and acts as a flame retardant. The reactive phosphinic acid and its use as a flame retardant monomer are taught in U.S. Pat. Nos. 4,033,936 and 3,941,752, incorporated herein by reference.

The spacing, size, height, and shape of the projections and optional depressions, the diameter of the filaments, and fabric construction are chosen to give the desired cushioning properties for the specific application. The shapes of the deformations also depend on the process used to make them. For example, in a deformation process in which the textile fabric is held against a plate with round holes and a cylindrical rod is pushed through the hole on the same side as the textile fabric, so that the textile fabric is pushed through the hole, the projections that are made in the textile fabric will be in the shape of truncated cones (i.e., the base and top of the projections will both be round), with the diameter of the top of the cone being the diameter of the rod that pushes the textile through the hole. Similarly, if a plate with square holes and a rod with a square cross section is used, the projections will be "hat-shaped".

The fiber networks described above are lightweight, durable and breathable. They are springy and resilient which means that they can be compressed (preferably repeatedly) without a significant loss in properties. These properties make them useful in vehicle seats for other purposes than as just a spacer. Depending on the stiffness of the fibers and the sizes of the projections, they may be used as cushioning materials, as impact absorbing materials, or as semi-rigid support materials. They are preferably made of only one polymer, such as PET, so that they can be easily recycled after use with other recyclable plastics, (e.g. bottles in the case of PET). The fiber network materials are generally used as single layers, but they can also be nested face to face, with the projections interlocking, or they can be stacked in numerous ways as for example, with the projections of one layer against the base plane of the next layer, with the base planes of the two layers against each other to provide thicker spacers and cushions, or with the flat areas at the tops of the projections facing each other and bonded together. The materials having more than one layer can be bonded together by such methods as adhesive bonding or ultrasonic welding. The use of multiple layers allows for greater flexibility in achieving a desired thickness and adjusting the cushioning properties.

The formed fiber network can be used as a vehicle seat cushioning material even without being connected to the heating and air conditioning systems of the vehicle. It is still comfortable because of its breathability and cushioning properties.

Whether or not the fiber network is connected to the heating and cooling system of the vehicle, it is used as an additional layer in combination with other elements commonly used in seats, such as a frame, springs, foam cushions, and the like. Seat designers can readily incorporate the fiber network into a vehicle seat by modification of the seat designs currently in use.

Examples of three dimensional fiber networks and how they can be used in an automobile seat, optionally with connections to the heating and cooling systems, are illustrated in the following Examples and in FIGS. 1–4.

EXAMPLES

Example 1

RITEFLEX®640 copolyetherester elastomer having a melting temperature of about 180° C., obtained from Hoechst Celanese Corporation, was melt spun to yield a 0.20 mm (435 denier) monofil having the following properties. The fiber tenacity was measured by ASTM Test Method D-3822 as 2.8 gpd, with 98% elongation at break. The elastic recovery of the fiber was measured by the same test method as 100% after 100 cycles at either 20% or 50% elongation. The monofil was knitted into a textile fabric having a wale of 8 wales/inch and a weft of 42 course/inch.

The knit fabric was shaped into a three-dimensional structure by using a heated press plate. The press plate was a metallic plate having 3/8 inch diameter holes, and was heated to about 160°–230° C. The fabric was pressed against the heated plate for 9 seconds, and pins that were 1/4 inch in diameter were then pushed through the holes. This yielded truncated cone shaped projections on the fabric which were about 3/8 inch in diameter at the base and 1/4 inch in diameter at the top. The projections were about 3/16 inches in height and were spaced in a square grid array with the nearest distance between the projections (center to center) being about 3/4 inch.

This shaped fiber network had a soft springy feel and could be repeatedly compressed without a loss of springiness.

Example 2

RITEFLEX®672 thermoplastic copolyetherester elastomer, which melts at about 205° C., was obtained from Hoechst Celanese Corporation, and was melt spun into 823 denier monofil (about 0.28 mm in diameter). The tenacity at break of the fiber was 2.4 gpd, and it had an elongation at break of 87%, as measured by ASTM Test Method D-3822. The elastic recovery of the fiber, measured by the same method, was 100% after 100 cycles at either 20% or 50% elongation.

The fiber was knitted into a fabric having the same wale and weft as that in Example 1. The fabric was deformed into a three-dimensional network using the press plate apparatus of Example 1 under the same conditions as in Example 1. This shaped fiber network also had a soft springy feel and could be repeatedly compressed without a loss of springiness.

Example 3

Commercial PET that was made for use in textile fabrics was melt spun into a 0.182 mm monofil (about 321 denier). The monofil was then made into a plain knit fabric with 16 wales and 24 courses per inch.

The fabric samples were deformed into a three-dimensional network using a similar kind of apparatus as described in Example 1, but having 1/4 inch holes in the press plate and 1/8 inch diameter cylindrical pins to yield conical projections with flat tops. The base and tops of the projections were the same as the diameter of the holes in the base plate and the diameter of the pins. The projections were arranged in a square grid array and were separated by 1/2 inch (center to center). The height of the projections was about 1/4 inch. The projections were made by heating the base plate and the pins to 240° C. and pressing the fabric through the holes for about 30 seconds. The deformed fabric was resilient and had a comfortable, springy feel when pressed down by hand, and retained its feel even after multiple compressions.

Example 4

A series of poly(ethylene terephthalate) (PET) fabric samples (both knit and woven) were made into three dimensional fiber network materials by the method of pressing the fabric against a heated base plate having a square grid array of evenly spaced holes at about 200° C. for two minutes and then pushing the fabric through holes in the base plates using cylindrical pins that were heated to about 180° C. The pins were kept in place (projected through the holes at temperature) for 15 seconds before being withdrawn, except in Sample No. 4 (below), where the pins were kept in place for 600 seconds. This resulted in three-dimensional networks of cone-shaped projections with flat tops which were evenly spaced and in which the bases of the projections had the diameter of the holes and the tops of the projections had the diameter of the pins. The heights of the projections (the thickness of the samples) was somewhat less than the depth of the penetrations through the holes by the pins due to shrinkage after the mechanical force was removed. Both knit and woven fabrics were tested.

These samples were subjected to compression tests using a modification of methods that are used for polyurethane foams and latex foams. Samples of the materials were placed between the plates of an Instron tensile tester and then pre-loaded to a load of 0.02 psi. The distance between the plates at 0.02 psi of compression was defined as the thickness of the sample. The samples were then compressed to 60% compression for two cycles at test speeds of 0.2 in/min for samples 0.10–0.29 inches in thickness, 0.5 in/min for samples 0.30–0.69 inches in thickness, and 1.0 in/min for samples 0.70–1.39 inches in thickness. The two pre-cycles above made a significant change in two of the samples (Nos. 4 and 6 in Table 1); the precycling measurements are also reported for these two samples. Six minutes after the precycling above, a compression test was run to 60% compression at the same speed as in the pre-cycling. Stress and percent compression were measured, and the stress at 25% and 50% compression was measured. These values are recorded in Table 1, along with the averages for runs where there were duplicate measurements. These measurements show an increase in stress with increasing compression, which is a characteristic that is desirable for cushioning applications.

The apparent volume was computed based on the thickness as measured at 0.02 psi above and the measured dimensions (length and width) of the sample. This was used to compute the apparent density, which ranged from 0.016 to 0.067 gms/cc. By comparison solid PET has a density of about 1.4 gms/cc. Thus the apparent density of the three dimensional fiber network is less than about 5% of the density of solid PET (1.1%–4.8% in these examples). The apparent densities of the samples in gms/cc are also listed in Table 1; these can be converted to pounds/cu. ft. by multiplying by 62.4.

Example 5

Figure 4:
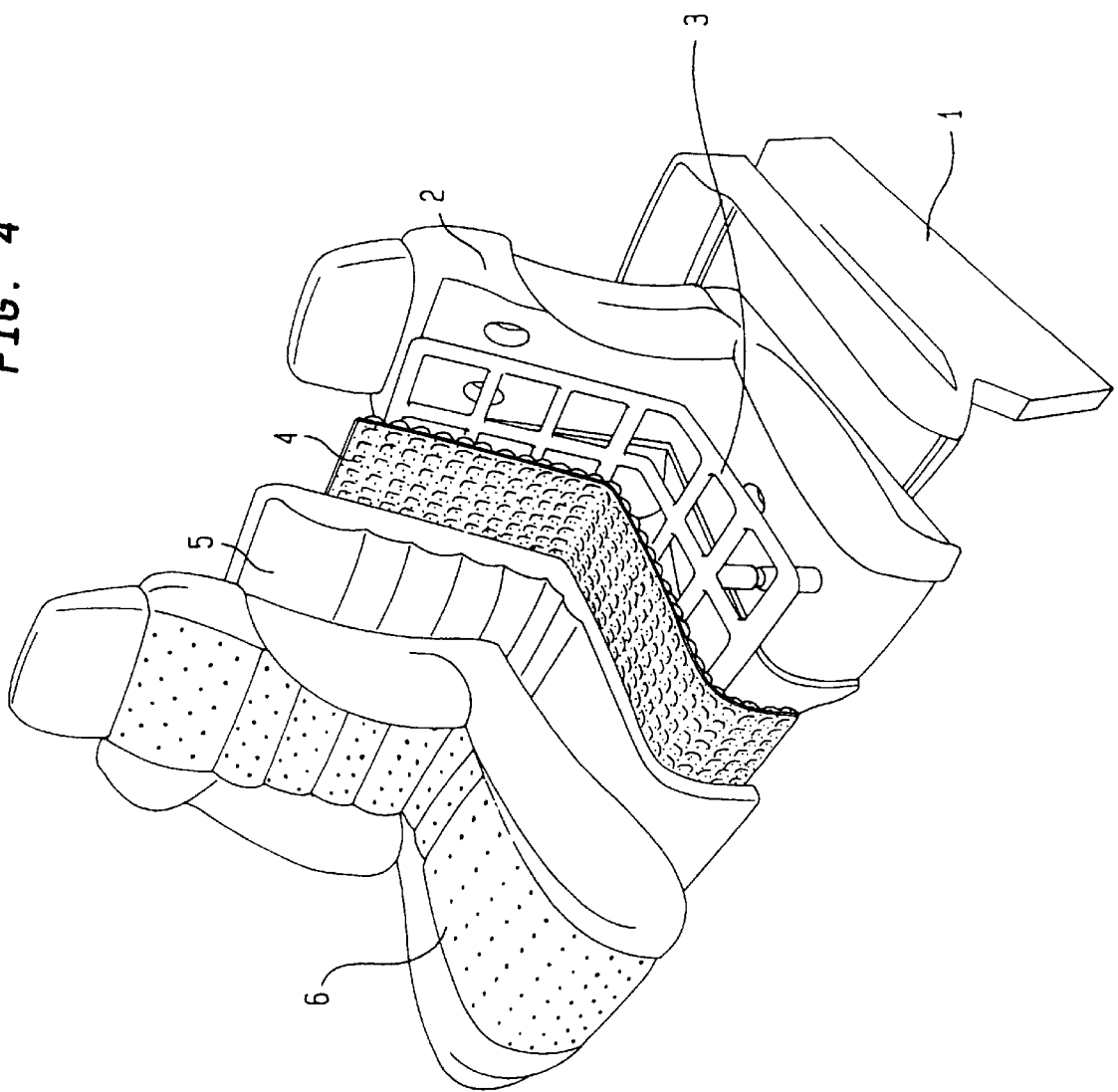
FIG. 4 illustrates a bucket seat and some of the many layers of materials that may be used, including the spacer layer in the form of a three-dimensional fiber network.

In FIG. 4, a bucket seat is shown with several layers of padding and other materials above the rigid support frame 1. A thick layer of rigid foam padding 2 is placed on the rigid frame. This is covered with an air dispersion filter 3, which is connected to the heating and cooling system of the car through hoses and/or ducts and which functions to distribute and filter the circulating air, which may be heated, cooled, or at ambient temperature, into the layer of three-dimensional formed fiber network 4. This is covered with a thin layer of porous foam 5 which has holes through it (not shown in FIG. 4) to enhance air circulation to the occupant of the seat. Finally, the seat is covered with a thin layer of cloth upholstery 6, which also may have holes to enhance air flow through the seat to the occupant of the seat.

The seat containing the three dimensional formed fiber network 4 can be incorporated into the HVAC system of an automobile. The heated or cooled air originates in the engine compartment of the automobile, and is passed through a duct or hoses to the interior of the car and into the layer of three-dimensional formed fiber product that is contained in the seat cushion. The resistance to air flow is low enough that the air that passes into the fiber network of the front seat can be vented through an opening in the back of the front seat toward the back seat of the automobile, so that the back seat passengers also receive air through vents that has been heated or cooled. Air from the heating and cooling system can also be fed directly into the back seat through pipes or duct works and then into the void volume inside the back seat in the same way as is done for the front seat.

Example 6

An example of a three-dimensional formed fiber network that can be used in the automobile seat follows. PET monofil having a diameter of about 0.2 mm is knit or woven into a fabric. The fabric is made into the desired three-dimensional fiber network by a deformation process in which ¾ inch diameter pins are pushed through 1.0 inch holes at a temperature of about 245° C. for 15 seconds, yielding projections that are shaped like truncated cones that are about 1.0 inch in diameter at the base, ¾ inch in diameter at the top, about ½ to ¾ inch in height, and are flat on top. The projections are laid out in a square grid array and are about 1.5 inches apart (center to center). The thickness (the height of the projections) for making ventilated vehicle seats is generally about 0.5 cm to 3 cm, though larger and smaller thickness may also be used.

If more rigid spacers are needed, composite materials can be made. For example, two or more formed fiber networks can be "nested" together, with the projections facing each other and interlocking; the base planes of the fiber network materials face outward. Alternatively, thicker materials can be obtained by placing two fiber networks together so that the base planes are together and the projections face outwards in both directions, or so that the flat areas at the tops of the projections face each other and the base planes face outward. The layers in both of these composites may be made to adhere to one another by the use of such methods as adhesive bonding or ultrasonic welding.

The seat design shown in FIG. 4 illustrates one seat design that incorporates three-dimensional formed fiber materials into the design. There are numerous variations, including changes in the order of the layers and the use of additional materials and layers of materials, that are readily apparent to a practitioner in the art, and the above illustrations and examples should not be viewed as limitations on the scope of this invention.

TABLE 1

Compression Tests

| Sample No. | Fabric Type[1] | Penetration (Inches) | Fiber Diameter (mm) | Measured Thickness[2] (inches) | Network Spacings[3] (inches) | Apparent Density (gms/cc) | Specimen No. | Stress @ 25% Compression (psi) | Stress @ 50% Compression (psi) |
|---|---|---|---|---|---|---|---|---|---|
| 1 | Woven 37 × 37 | 0.313 | 0.25 | 0.195 | ½ × ¾ × 1 | 0.047 | 1 | 1.07 | 1.73 |
|  |  |  |  |  |  |  | 2 | 1.11 | 1.73 |
|  |  |  |  |  |  |  | avg | 1.09 | 1.73 |
| 2 | Woven 20 × 20 | 0.313 | 0.40 | 0.200 | ½ × ¾ × 1 | 0.065 | 1 | 2.22 | 3.26 |
|  |  |  |  |  |  |  | 2 | 2.32 | 3.37 |
|  |  |  |  |  |  |  | avg | 2.27 | 3.31 |
| 3 | Knit | 0.363 | 0.20 | 0.345 | ½ × ¾ × 1 | 0.023 | 1 | 0.27 | 0.79 |
|  |  |  |  |  |  |  | 2 | 0.29 | 0.83 |
|  |  |  |  |  |  |  | avg | 0.28 | 0.81 |
| 4 | Knit | 0.563 | 0.20 | 0.495 | ½ × ¾ × 1 | 0.016 | 1 | 0.53 | 0.90 |
|  |  |  |  |  |  |  | 2 | 0.55 | 0.90 |
|  |  |  |  |  |  |  | 3 | 0.82 | 1.00 |
|  |  |  |  |  |  |  | —[4] | — | — |
| 5 | Woven 37 × 37 | 0.188 | 0.25 | 0.140 | ¼ × ⅜ × ½ | 0.064 | 1 | 5.44 | 8.01 |
|  |  |  |  |  |  |  | 2 | 5.68 | 9.09 |
|  |  |  |  |  |  |  | avg | 5.56 | 8.55 |
| 6 | Woven 20 × 20 | 0.188 | 0.40 | 0.193 | ¼ × ⅜ × ½ | 0.067 | 1 | 13.73 | 23.45 |
|  |  |  |  |  |  |  | 2 | 20.21 | 34.07 |
|  |  |  |  |  |  |  | —[5] | — | — |
| 7 | Knit | 0.313 | 0.20 | 0.195 | ¼ × ⅜ × ½ | 0.040 | 1 | 1.11 | 2.98 |
|  |  |  |  |  |  |  | 2 | 1.11 | 3.04 |
|  |  |  |  |  |  |  | avg | 1.11 | 3.01 |

[1]The knit fabrics were a plain Jersey knit having approximately 17 wales/inch and approximately 38 courses/inch. For the woven fabrics, the units are given in yarns per inch.
[2]At 0.02 psi
[3]Diameter at top of projection × diameter at bottom of projection × spacing (center to center), in inches.
[4]Pre-cycling significantly changes load curve characteristics. Specimens #1 and #2 were run with pre-cycling. Specimen #3 was run without pre-cycling.
[5]Pre-cycling significantly changes load curve characteristics. Specimen #1 was run with pre-cycling. Specimen #2 was run without pre-cycling.

We claim:

1. A vehicle seat comprising (a) two or more layers of materials selected from cushioning materials and fabrics, and (b) a spacer layer between said layers of materials and positioned within about one inch of the outer surface of said seat, wherein said spacer layer comprises one or more layers of a three-dimensional fiber network comprising a knit or woven textile fabric having a multiplicity of projections comprised of said textile fabric rising from the plane of said textile fabric, said textile fabric comprising thermoplastic filaments having a diameter of at least about 0.1 mm, wherein said spacer layer has a density less than about 10% of the density of the materials used to make said spacer layer.

2. The vehicle seat as recited in claim 1, wherein said spacer layer is connected to the heating and ventilation system of said vehicle.

3. The vehicle seat as recited in claim 1, wherein said spacer layer is connected to the air conditioning system of said vehicle.

4. The vehicle seat as recited in claim 1, wherein said thermoplastic filaments consist essentially of a thermoplastic polymer.

5. The vehicle seat as recited in claim 4, wherein said thermoplastic filaments are monofils and said projections are resilient, returning substantially to their original shape after being compressed to 50% of their original height.

6. The vehicle seat as recited in claim 1, wherein said spacer layer consists essentially of one layer of said three-dimensional fiber network.

7. A vehicle seat comprising a knit or woven textile fabric having a multiplicity of projections comprised of said textile fabric rising from the plane of said textile fabric, said textile fabric comprising thermoplastic filaments having a diameter of at least about 0.1 mm.

8. The vehicle seat as recited in claim 7, wherein said projections are resilient, returning substantially to their original shape after being compressed to 50% of their original height.

9. The vehicle seat as recited in claim 7, wherein said thermoplastic filaments are monofils that consist essentially of a thermoplastic polymer.

10. The vehicle seat as recited in claim 9, wherein said thermoplastic polymer has a melting temperature in the range of about 80° C. to about 375° C.

11. The vehicle seat as recited in claim 9, wherein said thermoplastic polymer is selected from the group consisting of polyesters, polyamides, thermoplastic copolyetherester elastomers, poly(arylene sulfides), polyolefins, aliphatic-aromatic polyamides, polyacrylates, and thermotropic liquid crystalline polymers.

12. The vehicle seat as recited in claim 9, wherein said thermoplastic polymer is a polyester.

13. The vehicle seat as recited in claim 9, wherein said thermoplastic polymer is poly(ethylene terephthalate).

14. The vehicle seat as recited in claim 9, wherein said thermoplastic polymer is selected from the group consisting of polypropylene, nylon 6, and nylon 66.

15. The vehicle seat as recited in claim 7, wherein said filaments in said fabric cross over one another at intersections, wherein said filaments at said intersections are not bonded.

16. The vehicle seat as recited in claim 7, said projections having apex points or flat tops, wherein said apex points or flat tops define a surface.

17. The vehicle seat as recited in claim 7, wherein said textile fabric also comprises depressions.

18. The vehicle seat as recited in claim 7, said filaments having a diameter in the range of about 0.15 mm to about 0.7 mm.

19. The vehicle seat as recited in claim 7, said projections having a height in the range of about 0.5 cm to about 3 cm.

20. A method of making a vehicle seat, comprising the steps of (a) providing a three-dimensional fiber network comprising a knit or woven textile fabric having a multiplicity of projections comprised of said textile fabric rising from the plane of said textile fabric, said textile fabric comprising thermoplastic filaments having a diameter of at least about 0.1 mm, and (b) incorporating said three-dimensional fiber network as a layer in said vehicle seat.

21. The method as recited in claim 20, wherein said three-dimensional fiber network layer is connected to the heating and ventilation system of said vehicle.

22. The method as recited in claim 20, wherein said three-dimensional fiber network layer is connected to the air conditioning system of said vehicle.

23. The method as recited in claim 20, wherein said three-dimensional fiber network layer is positioned between two or more layers of fabric and/or cushioning materials and is positioned within about one inch of the outer surface of said seat.

* * * * *

UNITED STATES PATENT AND TRADEMARK OFFICE
CERTIFICATE OF CORRECTION

PATENT NO. : 5,833,321

DATED : November 10, 1998

INVENTOR(S) : Kim et al.

It is certified that error appears in the above-identified patent and that said Letters Patent is hereby corrected as shown below:

Column 12, line 37, after "mm" insert --, wherein the density of said textile fabric is less than about 10% of the density of said thermoplastic fiber--.

Signed and Sealed this

Thirtieth Day of March, 1999

Attest:

Attesting Officer

Q. TODD DICKINSON

Acting Commissioner of Patents and Trademarks